US007569143B2

(12) United States Patent
Blizard et al.

(10) Patent No.: US 7,569,143 B2
(45) Date of Patent: Aug. 4, 2009

(54) APPARATUS, SYSTEM, AND METHOD FOR SMALL-PARTICLE LIQUID FILTRATION ENHANCEMENT

(75) Inventors: Norm Blizard, Columbus, IN (US); David P. Genter, Columbus, IN (US); Joshua G. Knight, Colubus, IN (US)

(73) Assignee: Cummins IP, Inc, Minneapolis, MN (US)

( * ) Notice: Subject to any disclaimer, the term of this patent is extended or adjusted under 35 U.S.C. 154(b) by 0 days.

(21) Appl. No.: 11/735,021

(22) Filed: Apr. 13, 2007

(65) Prior Publication Data

US 2008/0035555 A1 Feb. 14, 2008

Related U.S. Application Data

(60) Provisional application No. 60/744,895, filed on Apr. 14, 2006.

(51) Int. Cl.
*B01D 35/00* (2006.01)
*B01D 35/30* (2006.01)

(52) U.S. Cl. ........................ 210/232; 210/767; 210/249

(58) Field of Classification Search ................. 210/232, 210/249, 767

See application file for complete search history.

(56) References Cited

U.S. PATENT DOCUMENTS

| | | | | | |
|---|---|---|---|---|---|
| 3,329,194 | A * | 7/1967 | Miliacca | ..................... | 210/132 |
| 4,552,662 | A * | 11/1985 | Webster et al. | .............. | 210/232 |
| 4,831,277 | A * | 5/1989 | Christopher | ................ | 290/1 A |
| 6,224,439 | B1 * | 5/2001 | Sato et al. | ................. | 440/88 R |
| 6,514,404 | B1 * | 2/2003 | Bauer | .......................... | 210/86 |
| 6,516,756 | B1 * | 2/2003 | Kato et al. | .............. | 123/73 AD |
| 6,735,940 | B2 * | 5/2004 | Stroia et al. | .................... | 60/286 |
| 6,793,818 | B1 * | 9/2004 | Entringer et al. | ............ | 210/238 |
| 2001/0025626 | A1 * | 10/2001 | Antonioli et al. | ............ | 123/456 |
| 2004/0112046 | A1 * | 6/2004 | Tumati et al. | ................. | 60/297 |

FOREIGN PATENT DOCUMENTS

JP 02-139358 U1 * 11/1990

* cited by examiner

*Primary Examiner*—Thomas M Lithgow
(74) *Attorney, Agent, or Firm*—Kunzler & McKenzie

(57) ABSTRACT

An apparatus, system, and method are disclosed for enhancing the filtration of small particles from liquid stream. The apparatus includes a fuel filter bank having with at least one fuel filter. The fuel filter bank is mounted on a mounting bracket. The mounting bracket couples to an internal combustion engine with a plurality of vibration dampeners. The engine may have a high pressure common rail fuel system. The vibration dampeners vibrationally isolate the fuel filter bank from the internal combustion engine, reducing the particle slip and degradation of the fuel filter bank.

25 Claims, 5 Drawing Sheets

APPARATUS, SYSTEM, AND METHOD FOR SMALL-PARTICLE LIQUID FILTRATION ENHANCEMENT

CROSS-REFERENCES TO RELATED APPLICATION

This application claims the benefit of U.S. Provisional Patent Application No. 60/744,895 entitled "Apparatus, System, and Method for Filtering Fine Particles in a Fuel System" and filed on Apr. 14, 2006 for Norm Blizard et al., which is incorporated herein by reference.

BACKGROUND OF THE INVENTION

1. Field of the Invention

This invention relates to fuel filtering and more particularly relates to filtering fine particles in a fuel filtering system.

2. Description of the Related Art

Meeting government mandated emissions standards for modern engines necessitates the use of sophisticated fuel injection systems. For example, aftertreatment systems may require advanced fuel delivery capabilities such as post-injection of fuel, and combustion recipes may require multiple injection events and/or shaped fuel injection events. Fuel system components, including fuel injectors and fuel injector ports, may exhibit poor durability and performance over time when the fuel supply contains small abrasive particulates. Previous engine fuel systems have operated sufficiently with particulates in the fuel less than about 10 microns in size. Modern high pressure fuel systems have closer tolerances and are less tolerant to particles below about 5 microns, often requiring particulate filtration down to 3 microns or lower. While fuel filters have been shown to achieve the screening of particulates down below two microns in size under laboratory conditions, fuel filters often show lower performance as installed in an application. Fuel filters also show a significant increase in particulate count through the filter after moderate degradation and aging of the filter.

There are several considerations to account for when selecting the mounting location for a particulate fuel filter. Manufacturers of engines, including diesel engines, often sell engines to an original equipment manufacturer (OEM) who then installs the engines into vehicle bodies and prepares those vehicles for delivery to a vehicle dealer. To ensure the broadest and simplest application of a given engine installation, manufacturers of engines couple vital equipment, like fuel filtration equipment, to the engine. However, fuel filters mounted on a vehicle, and especially directly on an engine, have exhibited significantly lower filtering performance than identical filters in a laboratory test condition. Nevertheless, mounting the fuel filters on the engine directly is desirable to provide a known and testable environment for the placement of engine components, as the vehicle configurations for a particular engine model are likely to vary widely. Further, OEMs prefer that engine systems require as little interaction with the vehicle as possible, and determining filter mounting locations for each vehicle adds to the engine integration burden.

Engines used in non-vehicle applications also install fuel filters in vibrational contact with the engine. For example, a pre-filter on an industrial application may be installed on a skid frame that is vibrationally in direct contact with an engine, and a final fuel filter that is mounted on the side of the engine. The pre-filter may be designed to filter small particles—for example particles larger than about 7 microns, while the final fuel filter may be designed to filter particles larger than 3-4 microns. Both of these filters may suffer from reduced filtration efficiency (i.e. increased inefficiency) relative to a test performance and/or a new filter performance, resulting in greater wear and earlier failure of fuel system components than initially estimated.

High performance fuel filters present other engine design challenges as most fuel filters continue to be rated according to tests developed for earlier, less sensitive filters. The in-use (in the field under normal operating conditions) filtering efficiencies observed for fine particles often do not match the testing efficiencies, causing injector failures and other problems much sooner than should be expected. Because modern filters of fine particulates operate at very high efficiencies, a modest degradation can dramatically increase particle counts passing through the fuel filter. For example, if a filter operates at 99% efficiency, but degrades to 97% efficiency after moderate use, the particle count through that filter will triple. The excess particulates in the fuel supply may cause injector degradation and fuel quality fluctuations. The lower filtering efficiency, in-use and after moderate degradation or aging, observed with fine particles may be such that a filter passes testing, and yet regularly fails in-use. Enhancing the efficiency of fine particle filtering, for example in fuel filters below about 10 micron filtering, will enhance the matching of laboratory tested filter results to in-use filter results, make fuel filters more robust to degradation through use and aging, and generally increase the capability of fuel filters to filter particles in the low micron particle size range.

SUMMARY OF THE INVENTION

From the foregoing discussion, the applicant asserts that a need exists for an apparatus, system, and method that enhances the in-use efficiency of fuel filters. Beneficially, such an apparatus, system, and method would allow a filter to be mounted in direct vibrational contact with an engine for applications that involve an internal combustion engine.

The present invention has been developed in response to the present state of the art, and in particular, in response to the problems and needs in the art that have not yet been fully solved by currently available fuel filtering technologies. Accordingly, the present invention has been developed to provide an apparatus, system, and method for filtering fine particles that overcome many or all of the above-discussed shortcomings in the art.

An apparatus of the present invention is disclosed to filter particles from a fluid. The apparatus includes at least one filter that filters particles from a fluid stream. The filter may be a fuel filter. The apparatus further includes a vibration source, which may be an internal combustion engine, where the filter is coupled to the vibration source. The apparatus further includes at least one vibration dampener interposed between the vibration source and the filter(s). The apparatus may further include a mounting bracket, where each filter is mounted on the mounting bracket and the vibration dampener(s) couples the mounting bracket to the vibration source. Each vibration dampener may be a rubber pad.

An apparatus is disclosed comprising a fuel filter bank to filter a fuel stream, where the fuel filter bank includes at least one fuel filter. The apparatus further includes a mounting bracket, where each filter is mounted on the mounting bracket. The apparatus further includes a vibration source, and at least one vibration dampener between the vibration source and the mounting bracket. The vibration dampener couples the mounting bracket to the vibration source. The vibration source may be an internal combustion engine, a firewall, a vehicle frame, and/or a metal frame. Each vibration dampener may be a plurality of vibration absorbers that isolate the mounting bracket from the vibration source. The apparatus may include the vibration dampeners as rubber washers.

In one embodiment, the vibration source may be an internal combustion engine with a high pressure common rail (HPCR) fuel system, and the mounting bracket may be coupled to the internal combustion engine with four vibration dampeners. The apparatus may include an aftertreatment system that utilizes fuel from the filtered fuel stream. The fuel filter bank may filter the fuel to particle sizes greater than one micron, to less than two microns, to less than five microns, and/or to between 1.5 to 5.0 microns. The fuel filter bank may comprise three fuel filters. The vibration source may be a skid frame coupled to an internal combustion engine.

A system of the present invention is presented to filter particles from a fluid. The system includes a fuel filter bank comprising at least one fuel filter, and an internal combustion engine. The internal combustion engine may include a high pressure common rail fuel system. The system further includes a fuel stream passing through the fuel filter bank to the internal combustion engine. The system further includes an aftertreatment system utilizing fuel from the fuel stream. The system further includes at least one vibration dampener interposed between the internal combustion engine and the fuel filter bank, the vibration dampeners coupling the fuel filter bank to the internal combustion engine.

A method of the present invention is presented to filter particles from a fluid. The method further includes providing an internal combustion engine, and a fuel filter bank comprising at least one fuel filter coupled to a connection location. The connection location is vibrationally coupled to the internal combustion engine. The method includes interposing the vibrational dampener(s) between the fuel filter bank and the connection location, and passing fuel through the fuel filter bank to the internal combustion engine. The connection location may be a vehicle frame rail, a firewall, and a mounting location on the internal combustion engine.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in FIGS. 1 through 5 is not intended to limit the scope of the invention, as claimed, but is merely representative of selected embodiments of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Particle sizes used herein are generally provided for example purposes only and should not be deemed to limit the scope of the invention. Where particle sizes are indicated, they may refer to physical dimensions of the particles or they may refer to particle sizes as defined in International Standards Organizations documents (ISO) 4572, and/or ISO 16889. These references are well known in the filtration art. Therefore, a particle size indicating 5 microns may be read as 5 microns (physical size) or 5 microns(c) (size according to ISO 16889). In any context where there may otherwise be ambiguity, the particles sizes should be read as sizes according to ISO 16889, i.e. 5 microns should be read as 5 microns (c).

Figure 1:
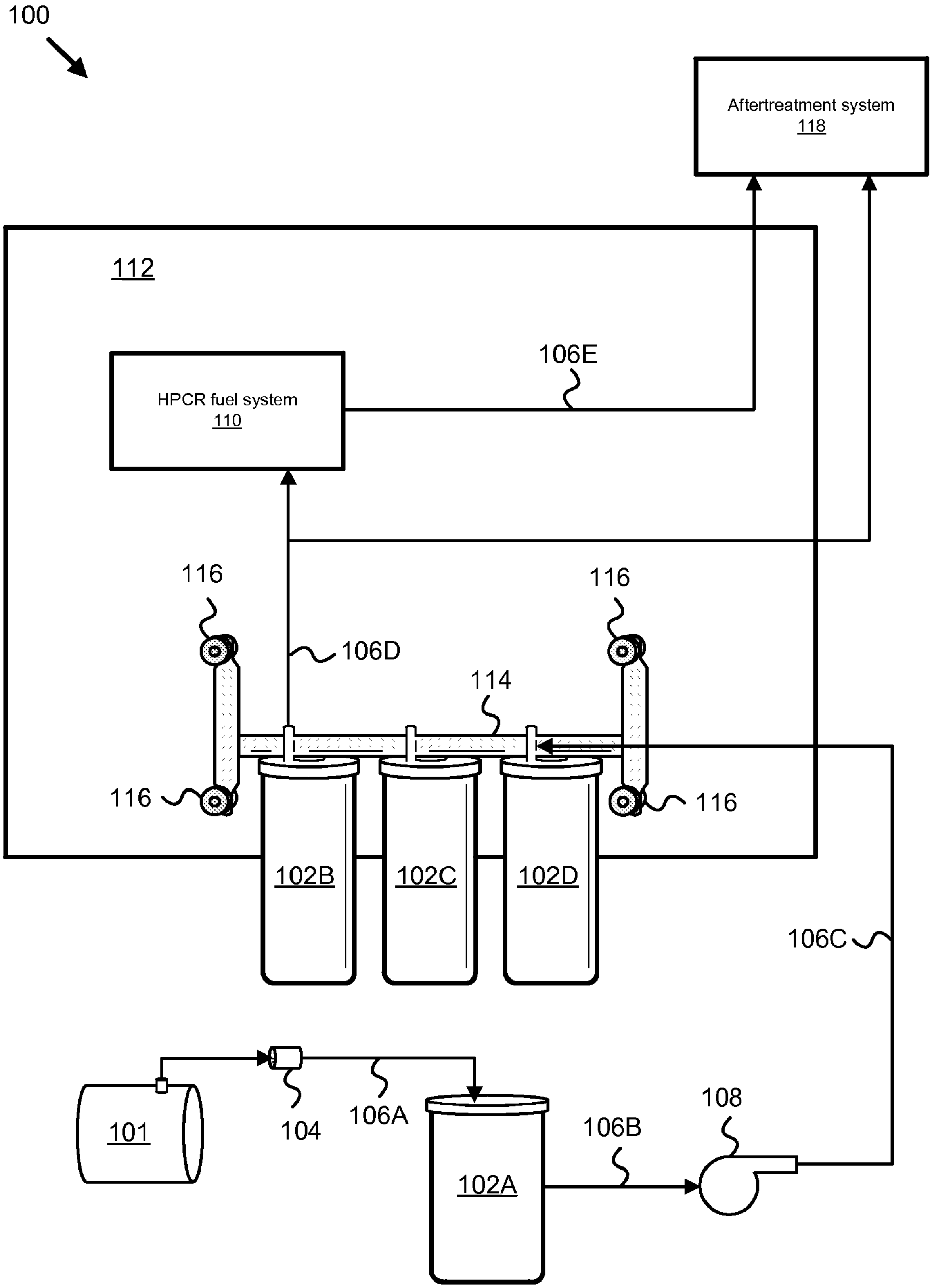
FIG. 1 is a schematic illustration depicting one embodiment of a system for filtering particles from a fluid in accordance with the present invention.

FIG. 1 is a schematic illustration depicting one embodiment of a system 100 for filtering particles from a fluid in accordance with the present invention. The system 100 may include a fuel tank 101 that stores fuel, and a coarse filter 104 (or "rock catcher") that prevents very large objects from entering a fuel stream 106A. The system may further include a pre-filter 102A that filters the fuel stream 106A to create a pre-filtered fuel stream 106B. The system 100 may further include a pump 108 that pressurizes the pre-filtered fuel stream 106B to create a pressurized fuel stream 106C. The pump 108 is generally a low-pressure pump (e.g. about 100 p.s.i.) to provide pressure for filtering through fine fuel filters 102B, 102C, 102D, and to ensure adequate fuel supply to a fuel system 110 on an internal combustion engine 112. The system 100 may include a fuel filter bank 102B, 102C, 102D that filters the pressurized fuel stream 106C to create a filtered fuel stream 106D. The fuel filter bank 102B, 102C, 102D may be mounted on a mounting bracket 114, which is coupled to the internal combustion engine 112 via at least one vibration dampener 116. The filtered fuel stream 106D may pass to an HPCR fuel system 110 and/or to an aftertreatment system 118 which may inject the filtered fuel 106D during a regeneration event. In one embodiment, the HPCR fuel system 110 passes fuel 106E to the aftertreatment system 118 as unburned hydrocarbons through a late post-injection event.

In one embodiment of the system 100, the system 100 includes at least one filter 102B, 102C, 102D configured to filter particles from a fluid stream 106C. The filter(s) 102B, 102C, 102D may be fuel filters to filter a fuel stream 106C. The system 100 further includes a vibration source 112, where the filter(s) 102B, 102C, 102D are coupled to the vibration source 112. The vibration source 112 may be an internal combustion engine 112. The system 100 may include vibration dampeners 116 interposed between the vibration source 112 and the filter(s) 102B, 102C, 102D. The system 100 may include a mounting bracket 114, where the filter(s) 102B, 102C, 102D are mounted to the mounting bracket 114, and the vibration dampeners 116 couple the mounting bracket 114 to the vibration source 112. The vibration dampeners 116 may include rubber pads.

In one embodiment of the system 100, the system 100 includes a fuel filter bank configured to filter a fuel stream 106C, where the fuel filter bank has at least one fuel filter 102B, 102C, 102D. The system 100 includes a mounting bracket 114, wherein each fuel filter 102B, 102C, 102D is mounted on the mounting bracket 114. The system 100 further includes a vibration source 112. The vibration source 112 may be an internal combustion engine, a firewall (e.g. within an engine compartment), a vehicle frame, and/or a metal frame. The system 100 includes a plurality of vibration dampeners 116 interposed between the vibration source 112 and the mounting bracket 114, wherein the vibration dampeners 116 couple the mounting bracket 116 to the vibration source 112. The vibration dampeners 116 may each comprise a rubber pad.

In one embodiment, the vibration source 112 is an internal combustion engine 112, and each vibration dampener 116 includes a plurality of vibrational absorbers isolating the mounting bracket from the internal combustion engine 112. The internal combustion engine 112 may have an HPCR fuel system 110. The filtered fuel stream 106D may be fed to the HPCR fuel system 110. Fuel systems 110 having very high injection pressures and small injection nozzles require very fine particulate filtering in the low-micron range. For example, the fuel filter bank 102B, 102C, 102D may substantially filter particles sized greater than about one micron from the fuel stream 106A. In one embodiment, the fuel filter bank 102B, 102C, 102D may filter particles sized from about 1.0 to about 5.0 microns from the fuel stream 106A. Substantially filtering as used herein indicates that at least some particles filtered by a given filter fall within the listed range. For example, if a filter removes particles above about 4 microns in a fluid stream, that filter substantially filters particles sized from about 1.0 to about 5.0 microns, because some particles intended to be filtered by a given filter fall within the listed range.

In one embodiment, at least one filter 102A of the fuel filter bank 102B, 102C, 102D is has a filter rating of $\beta_{5(c)}$ of at least 75, or in one embodiment, a filter rating of $\beta_{5(c)}$ of at least 75. The term β is well known in the filtration art, and refers to the filtration ratio, or the upstream count divided by the downstream count for a given particle size. Thus, a rating of $\beta_{5(c)}$ of at least 75 indicates that for particles sized 5 micron(c), the upstream count divided by the downstream count will be at least 75.

The vibrational absorbers may be rubber washers. In one embodiment, the vibrational absorbers may be elastic polymers, viscoelastic materials, and/or other materials known in the art to isolate vibrations. In one embodiment, the mounting bracket 114 is coupled to the internal combustion engine 112 with four vibration dampeners 116. The number of vibration dampeners 116 utilized depends upon the vibrational environment experienced by the filters 102B, 102C, 102D and the stresses (rotational, torsional, axial, etc.) experienced by the mounting bracket 114 and is within the skill of one in the art to select appropriate placement and numbering of vibration dampeners 116 for a specific application based on the disclosures herein. For fuel filters 102B, 102C, 102D in the low-micron filtering range mounted on the side of an internal combustion engine 104, four vibration dampeners 116 placed as schematically indicated has been shown to produce in-use filtering results similar to laboratory test condition filtering results.

In one embodiment, a fuel filter bank comprising a fuel filter 102A is mounted in a connection location (not shown)—for example a vehicle frame rail—that is vibrationally coupled to the internal combustion engine 112. The system 100 may include a vibration dampener (not shown) interposed between the fuel filter bank 102A and the connection location.

In one embodiment, the system 100 further includes an aftertreatment system 118 that utilizes fuel from the fuel stream 106A. In one embodiment, the aftertreatment system 118 takes a filtered fuel stream 106D directly from the fuel filter bank 102B, 102C, 102D and injects the fuel somewhere within the aftertreatment system 118, for example to place unburned hydrocarbons across of a diesel oxidation catalyst (DOC) to generate temperature in the aftertreatment system 118. In one embodiment, the aftertreatment system 118 receives a fuel stream 106E from an HPCR fuel system 114, for example as very late post-injected fuel 106E that is received as unburned hydrocarbons for oxidation on a DOC.

An arrangement of filters 102B, 102C, 102D configured to filter particulates incrementally from coarse to fine may increase the durability of fuel filters 102B, 102C, 102D, especially high performance fuel filters that filter low-micron particulates at high efficiencies. In alternate embodiments the system 100 may include a single filter 102A, or an arrangement of identical fuel filters 102B, 102C, 102D arranged in parallel such that the flow rate of fuel through the filters 102B, 102C, 102D and/or particulate storage capacity of the filters is increased.

The HPCR fuel system 110 of the system 100 may be configured to provide fuel at precise intervals and in precise quantities to an aftertreatment system 118. To achieve the precision required of the HPCR fuel system 110, and to achieve desired combustion characteristics to achieve emissions targets, the HPCR fuel system 110 may have components produced and configured within very tight tolerances that may be susceptible to damage from abrasive, fine particulates within the fuel supply.

Figure 2:
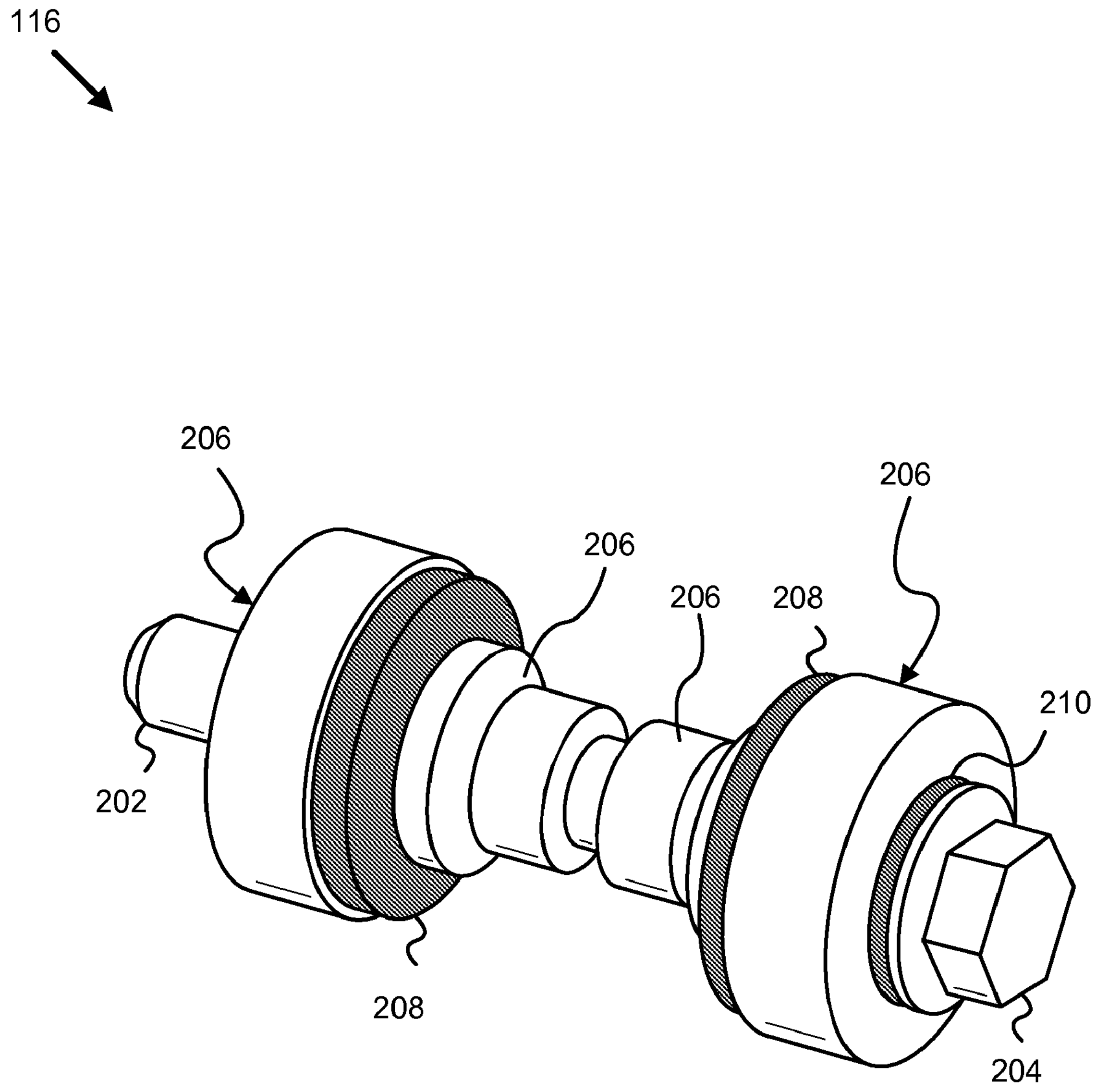
FIG. 2 is an illustration depicting one embodiment of a vibration dampener in accordance with the present invention.

FIG. 2 is an illustration depicting one embodiment of a vibration dampener 116 in accordance with the present invention. The vibration dampener 116 may comprise an attachment segment 202, for example the end of a bolt 202, configured to anchor the vibration dampener 116 to an internal combustion engine 112. The vibration dampener 116 may further comprise a removable cap screw 204 configured to couple and uncouple the vibration dampener 116 to a mounting bracket 114 (not shown) for the at least one fuel filter bank 102B, 102C, 102D. The mounting bracket may also include a slot (not shown) for facilitating coupling of the vibration dampener 116 to the bracket. The bolt 202 or removable cap screw 204 is extendable through the vibrational absorbers 206 and the slot in the mounting bracket 114 to couple the vibration dampener 116 to the mounting bracket. When coupled to the vibration dampener 116 via the bolt 202, the mounting bracket 114 is positioned between the absorbers along the bolt and in some implementations, a portion of each of the vibrational absorbers 206 can extend into the slot of the mounting bracket.

In one embodiment the vibration dampener 116 includes one or more vibrational absorbers 206 which may be rubber pads 206. A rubber pad 206 may be configured as a washer 206, gasket 206, 0-rings 206, or other functional shape. Furthermore, other elastic polymers 206 or materials comprising vibration reducing and/or absorbing properties are considered within the scope of the present invention. For example, a metallic spring, a pneumatic cylinder, an organic fiber, and/or a gelatinous substance may be useful as vibrational absorbers 206 for particular applications of the vibration dampener 116. The vibration dampener 116 further includes a set of spacing washers 208. The spacing washers 208 may provide the proper spacing for the vibration dampener 116 and may protect the vibrational absorbers 206 from wear and damage during installation and use. The spacing washers 208 may comprise metal, hardened plastic, or other materials suited for the environment and physical requirements of the particular application in which the vibration dampener 116 is mounted. The vibration dampener 116 may further comprise one or more end washers 210. The end washer 210 may provide proper spacing for the vibration dampener 116, protect the vibrational absorbers 206, and provide a surface for seating the cap screw 204. The end washer 210 may comprise metal, hardened plastic, or other materials suited for the environment and physical requirements of the particular application in which the vibration dampener 116 is mounted. The vibration dampener 116 may further comprise a washer (not shown) between the internal combustion engine 112 and the vibrational absorber 206 proximate the attachment segment 202.

Figure 3:
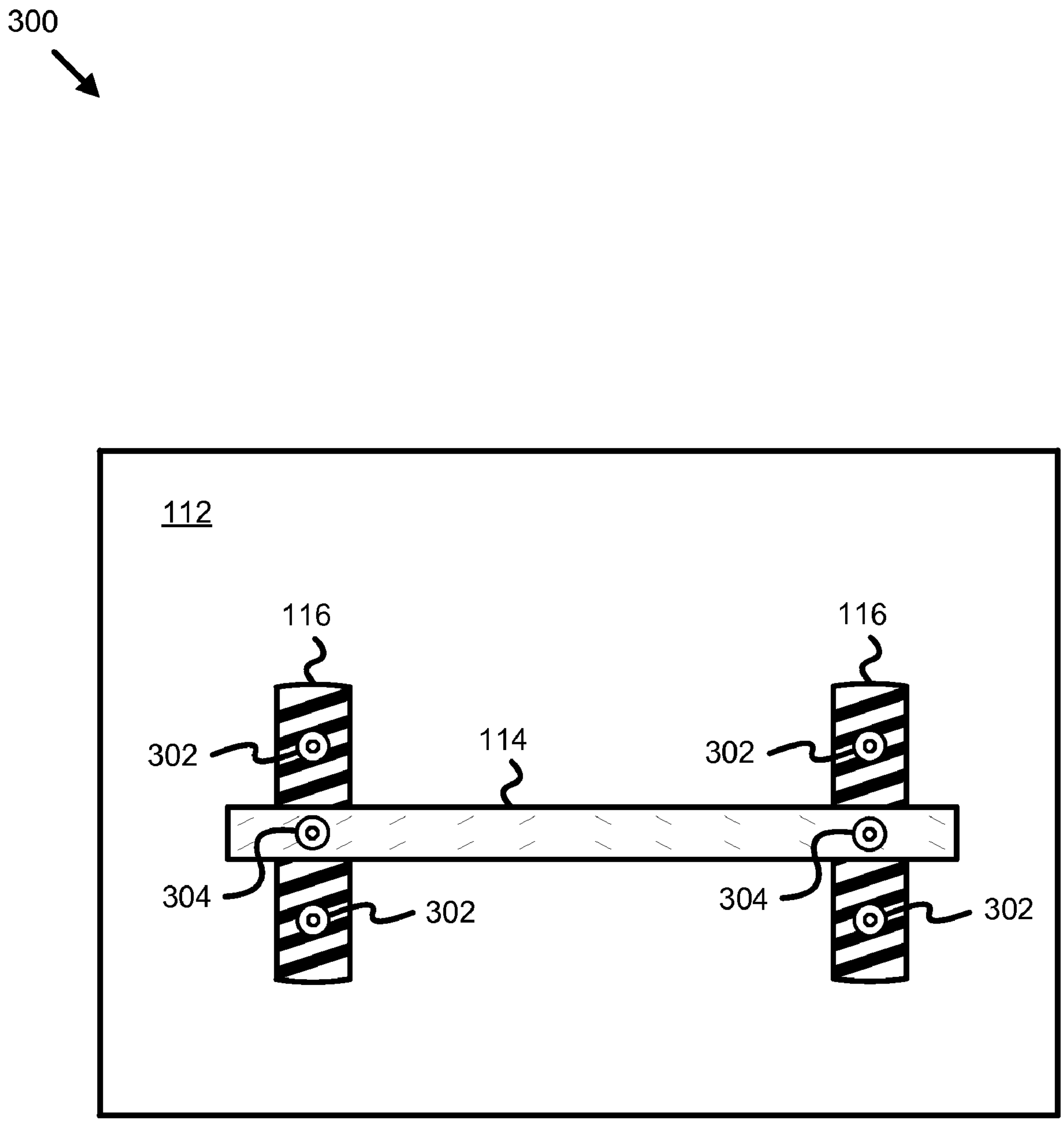
FIG. 3 is a schematic illustration depicting one embodiment of vibration dampeners and a mounting bracket in accordance with the present invention.

FIG. 3 is a schematic illustration 300 depicting one embodiment of vibration dampeners 116 and a mounting bracket 114 in accordance with the present invention. In one embodiment, the vibration dampeners 116 may comprise rubber pads 116 configured geometrically to support the mounting bracket 114 and to couple the mounting bracket 114 and fuel filter bank 102B, 102C, 102D to an internal combustion engine 112. The illustration 300 includes engine-side cap screws 302 that fix the vibration dampeners 116 to the engine 112, and bracket-side cap screws 304 that fix the mounting bracket 114 to the vibration dampeners 116. Various other geometric configurations and numbers of vibration dampeners 116 are possible and understood by one of skill in the art based on the disclosures herein.

Figure 4:
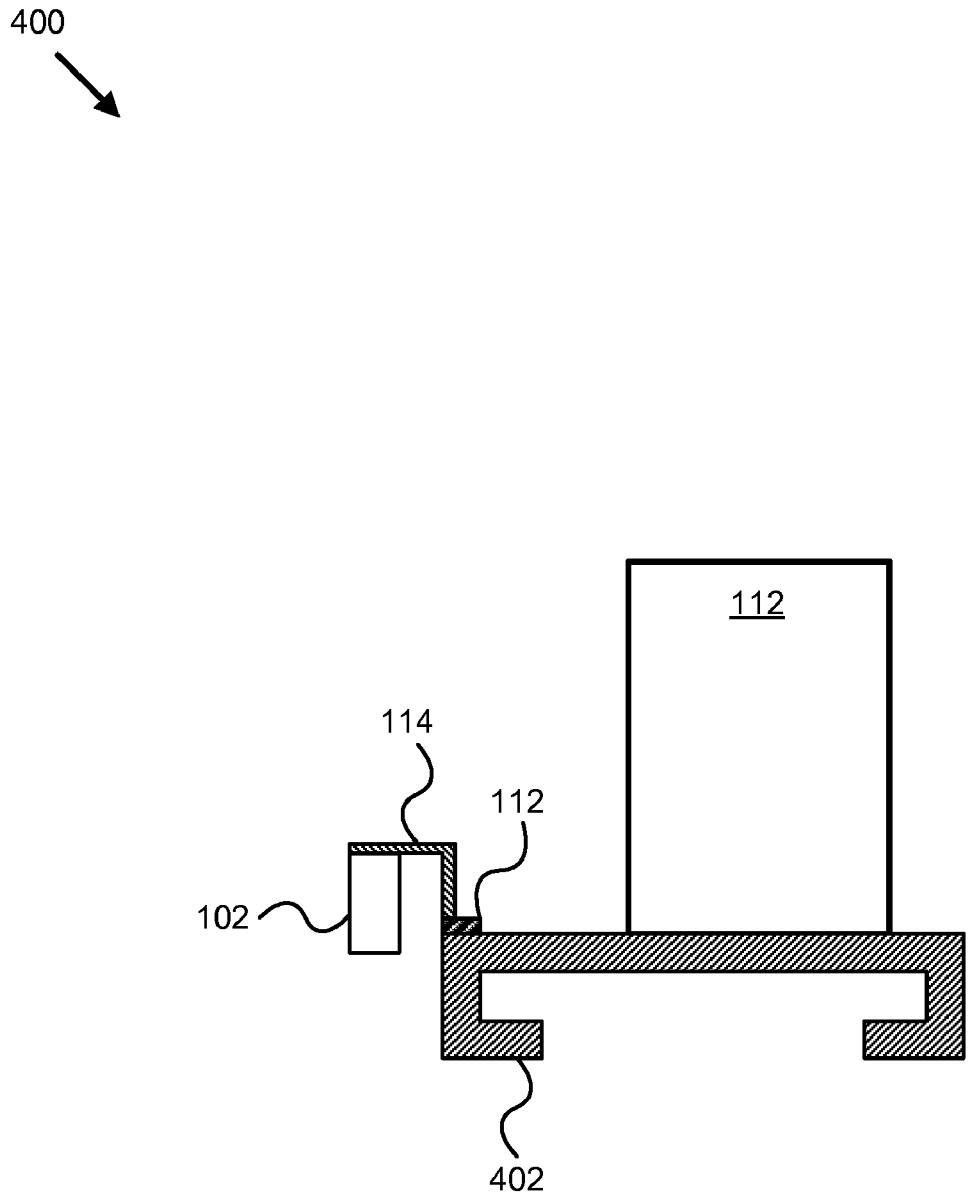
FIG. 4 is a schematic illustration depicting one embodiment of a vibration dampener and a mounting bracket in accordance with the present invention.

FIG. 4 is a schematic illustration 400 depicting one embodiment of a vibration dampener and a mounting bracket in accordance with the present invention. The illustration 400 includes a fuel filter 102 mounted on a mounting bracket 114. An internal combustion engine 112 is mounted on a skid frame 402, vibrationally coupling the skid frame 402 to the internal combustion engine 112. A vibration dampener 112 is interposed between the mounting bracket 114 and the skid frame 402, thereby coupling the filter 102 to the vibration source 402. In one embodiment, the vibration dampener 112 may be a rubber pad.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
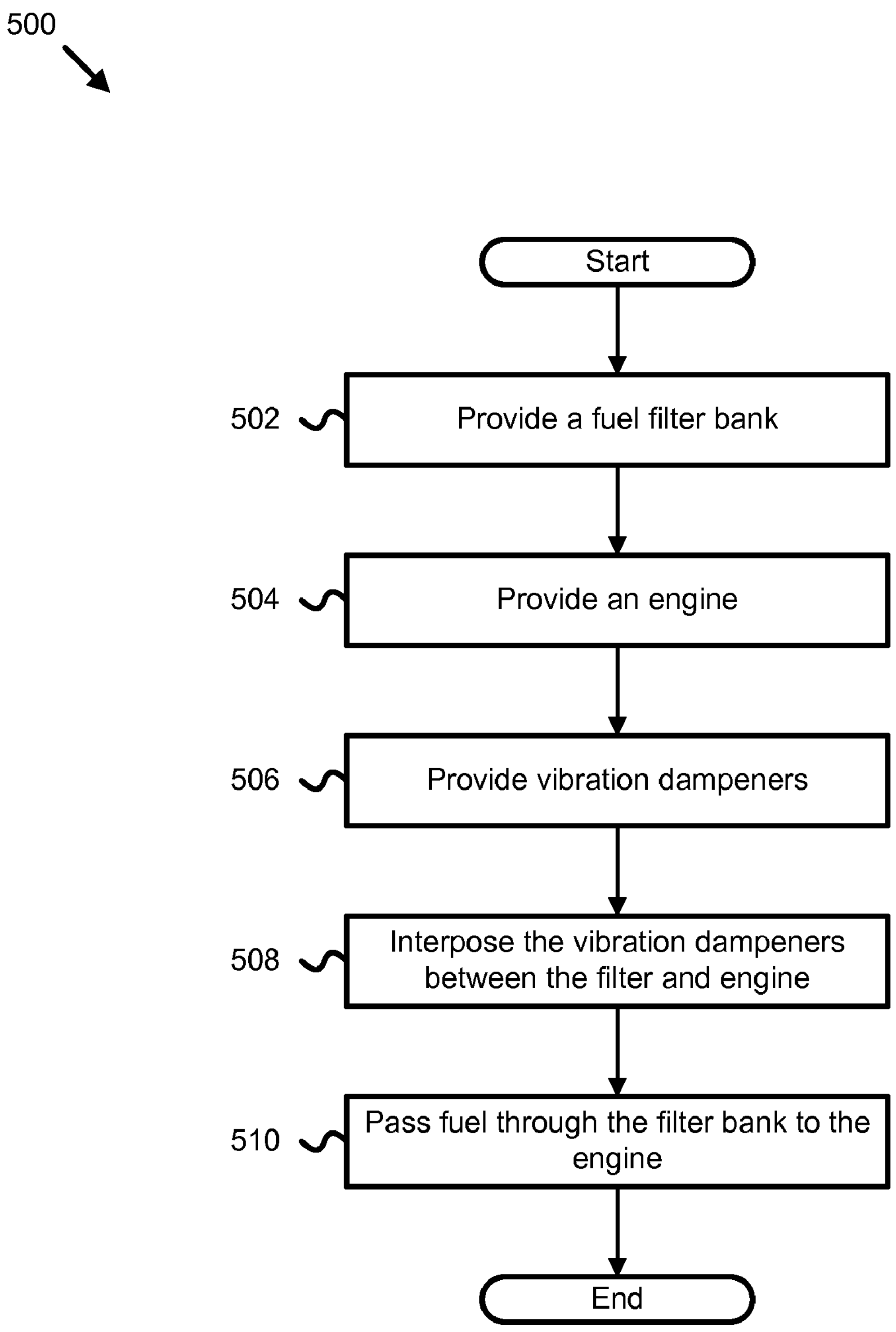
FIG. 5 is a schematic flow chart diagram illustrating one embodiment of method for filtering particles from a fluid in accordance with the present invention.

FIG. 5 is a schematic flow chart diagram illustrating one embodiment of method 500 for filtering particles from a fluid in accordance with the present invention. The method 500 includes a practitioner providing 502 a fuel filter bank 102B, 102C, 102D including at least one fuel filter for an application. The method 500 further includes providing 504 an internal combustion engine 112, and providing 506 a plurality of vibration dampeners 116. The method 500 further includes interposing 508 the vibration dampeners 116 between the fuel filter bank 102B, 102C, 102D and the internal combustion engine 112. The method 500 further includes passing 510 fuel through the filter bank 102B, 102C, 102D to the internal combustion engine 112.

The present invention thereby provides a method, system, and apparatus to filter particles from a fluid that allows filter performance in-use to achieve the filtering levels observed under laboratory conditions. The method, system, and apparatus further allows a filtering application to be installed directly on an engine and achieve low-micron filtering capacity. The improved function of the filter allows longer maintenance intervals for the fuel supply and better reliability for fuel system parts.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to filter particles from a fluid, the apparatus comprising:

at least one filter configured to filter particles from a fluid stream;

a vibration source, wherein the at least one filter is coupled to the vibration source; and at least one vibration dampener interposed between the vibration source and the at least one filter, the at least one vibration dampener comprising first vibrational absorber, a second vibrational absorber, and a fastener, wherein the fastener extends through the first and second vibrational absorbers, and wherein the fastener is secured to the vibration source.

2. The apparatus of claim 1, wherein each filter is a fuel filter.

3. The apparatus of claim 1, wherein the vibration source is an internal combustion engine.

4. The apparatus of claim 1, further comprising a mounting bracket, wherein each fuel filter is mounted on the mounting bracket, and wherein the at least one vibration dampener couples the mounting bracket to the vibration source.

5. The apparatus of claim 1, each vibration dampener comprising a rubber pad.

6. An apparatus to filter particles from a fluid, the apparatus comprising:

a fluid filter bank configured to filter a fluid stream, the fluid filter bank comprising at least one fluid filter;

a mounting bracket, wherein the at least one fluid filter is mounted to the mounting bracket;

a vibration source; and at least one vibration dampener coupling the mounting bracket to the vibration source, the at least one vibration dampener comprising a first vibrational absorber, a second vibrational absorber, and a fastener, wherein the fastener extends through the first vibrational absorber, second vibrational absorber, and mounting bracket, wherein the fastener is secured to the vibration source, and wherein the first vibrational absorber is spaced apart from the second vibrational absorber and the mounting bracket is positioned between the first and second vibrational absorbers along the fastener.

7. The apparatus of claim 6, wherein each vibration dampener comprises a rubber pad.

8. The apparatus of claim 6, wherein the vibration source comprises a member selected from the group consisting of an internal combustion engine, a firewall, a vehicle frame, and a metal frame.

9. The apparatus of claim 6, wherein the vibration source comprises an internal combustion engine, and wherein each vibration dampener comprises a plurality of vibrational absorbers isolating the mounting bracket from the internal combustion engine.

10. The apparatus of claim 9, wherein each vibrational absorber comprises a rubber washer.

11. The apparatus of claim 9, wherein the mounting bracket is coupled to the internal combustion engine with four vibration dampeners.

12. The apparatus of claim 6, wherein the vibration source comprises an internal combustion engine with a high pressure common rail fuel system.

13. The apparatus of claim 6, further comprising an aftertreatment system, wherein the aftertreatment system utilizes fuel from the filtered fuel stream.

14. The apparatus of claim 6, wherein the fluid filter bank substantially filters particles sized greater than one micron.

15. The apparatus of claim 6, wherein the fluid filter bank substantially filters particles sized from about 1.0 microns to about 5.0 microns.

16. The apparatus of claim 6, wherein the fluid filter bank comprises multiple fluid filters.

17. The apparatus of claim 6, wherein the vibration source comprises a skid frame coupled to an internal combustion engine.

18. The apparatus of claim 17, wherein the vibration dampener comprises a rubber pad.

19. A method to filter particles from a fluid, the method comprising:

providing an internal combustion engine;

providing a fuel filter bank comprising at least one fuel filter coupled to a connection location, the connection location being vibrationally coupled to the internal combustion engine;

selecting a number of vibration dampeners corresponding to a desired particle filtration efficiency during operation of the internal combustion engine, each vibration dampener comprising a first vibrational absorber, a second vibrational absorber, and a fastener, wherein the fastener extends through the first and second vibrational absorbers;

interposing the selected number of vibration dampeners between the fuel filter bank and the connection location by positioning a portion of the fuel filter bank between the first and second vibrational absorbers and securing the fastener to the connection location; and passing fuel through the fuel filter bank to the internal combustion engine.

20. The method of claim 19, wherein the at least one fuel filter comprises a beta ratio of at least 75 for particles of less than two microns.

21. The method of claim 19, wherein the at least one fuel filter comprises a beta ratio of at least 75 for particles of less than five microns.

22. The method of claim 19, wherein the connection location comprises a member selected from the group consisting of a vehicle frame rail, a firewall, and mounting location on the internal combustion engine.

23. The method of claim 19, wherein the selected number of vibration dampeners comprises four, each vibration dampener comprising at least one rubber pad.

24. A system to filter particles from a fluid, the system comprising:

a fuel filter bank comprising at least one fuel filter;

an internal combustion engine;

a fuel stream passing through the fuel filter bank to the internal combustion engine a mounting bracket coupled to the fuel filter bank, the mounting bracket comprising at least one slot; and at least one vibration dampener interposed between the internal combustion engine and the fuel filter bank, the at least one vibration dampener coupling the fuel filter bank to the internal combustion engine and comprising a first vibrational absorber, a second vibrational absorber, and a fastener, wherein the fastener extends through the first vibrational absorber, the second vibrational absorber, and the at least one slot of the mounting bracket such that the mounting bracket is positioned between the first and second vibrational absorbers along the fastener, and wherein a portion of each of the vibrational absorbers extends into the slot of the mounting bracket.

25. The system of claim 24, wherein the internal combustion engine has a high pressure common rail fuel system.

* * * * *